United States Patent [19]

Witt et al.

[11] Patent Number: 4,688,475
[45] Date of Patent: Aug. 25, 1987

[54] COOKING APPARATUS

[75] Inventors: Allan E. Witt, Westport; Andrew B. Macri, Bridgeport; Mario Pasquini, Milford, all of Conn.

[73] Assignee: Food Automation-Service Techniques, Inc., Stratford, Conn.

[21] Appl. No.: 937,988

[22] Filed: Dec. 4, 1986

Related U.S. Application Data

[63] Continuation-in-part of Ser. No. 840,363, Mar. 17, 1986, abandoned.

[51] Int. Cl.⁴ .......................... A47J 27/00; A47J 37/10
[52] U.S. Cl. ........................................ 99/325; 99/408; 364/400
[58] Field of Search ............... 99/325, 330, 408, 403, 99/280, 282, 285, 283, 342, 444; 364/400

[56] References Cited

U.S. PATENT DOCUMENTS

| | | | |
|---|---|---|---|
| 3,701,313 | 10/1972 | Beggs | 99/408 X |
| 3,853,044 | 12/1974 | Albright et al. | 99/408 X |
| 3,973,481 | 8/1976 | Mies | 99/408 X |
| 4,197,581 | 4/1980 | Watrous et al. | 364/400 |
| 4,210,123 | 7/1981 | Moore et al. | 99/330 X |
| 4,324,173 | 4/1982 | Moore et al. | 99/408 X |
| 4,437,159 | 3/1984 | Waugh | 364/400 |
| 4,623,544 | 11/1986 | Highnote | 99/408 X |

Primary Examiner—H. Hampton Hunter
Attorney, Agent, or Firm—Felfe & Lynch

[57] ABSTRACT

Cooking apparatus controlled by a programmed digital microcomputer for determining whether the cooking process is complete and for filtering the cooking medium when, for example, only one cooking process is complete. The apparatus also determines whether the cooking medium has been filtered and locks out the initiation of a cooking process after, for example, the completion of only one cooking process at least until the apparatus determines that the cooking medium has been filtered.

8 Claims, 5 Drawing Figures

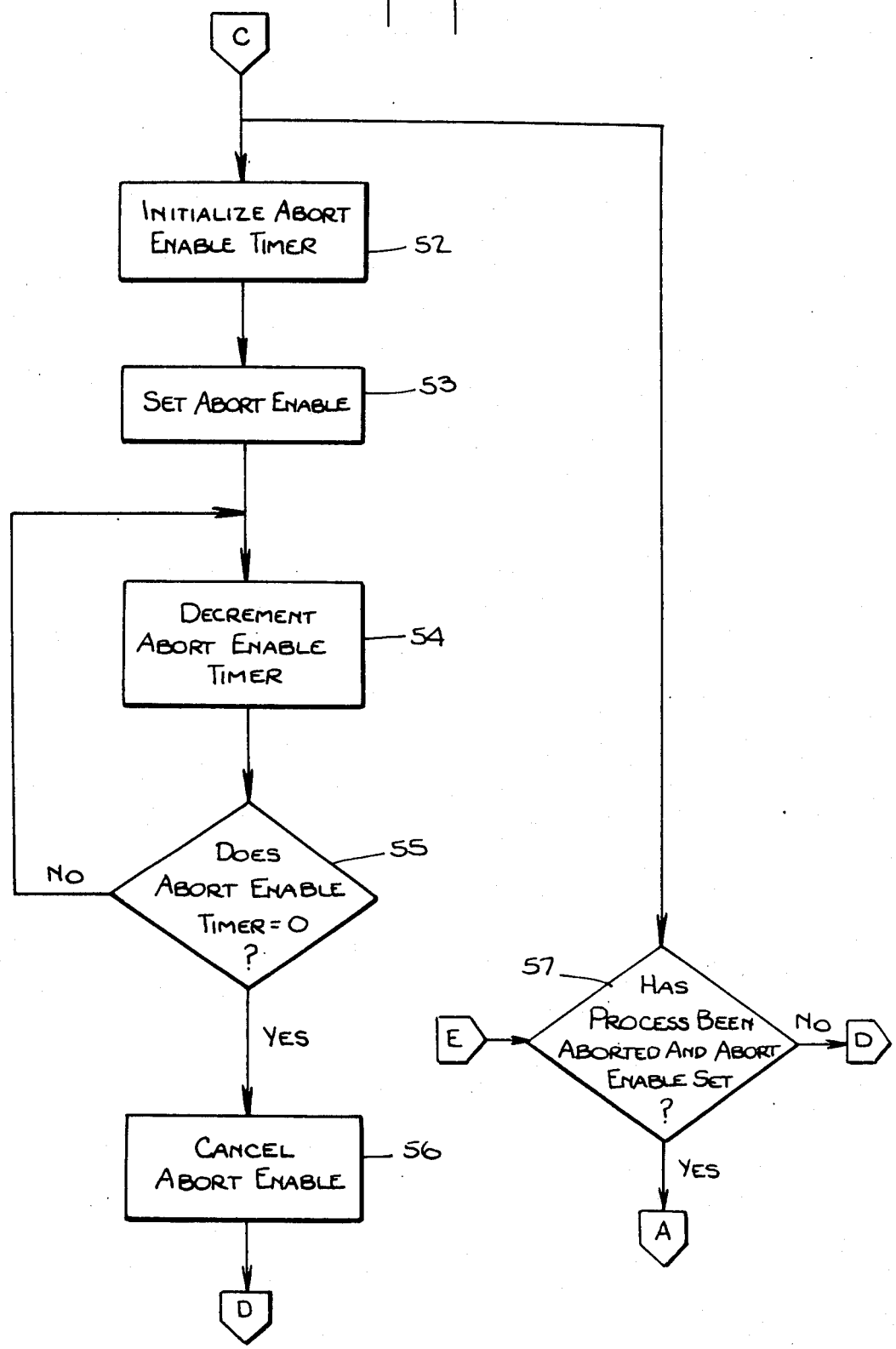

COOKING APPARATUS

This application is a continuation-in-part of copending application Ser. No. 840,363, filed Mar. 17, 1986 by Allan E. Witt and Andrew B. Macri and now abandoned.

This invention relates to cooking apparatus and, more particularly, to cooking apparatus controlled by a programmed digital microcomputer and suitable for use as commercial cooking apparatus.

In a commercial cooking apparatus utilizing a cooking medium such as cooking oil or shortening for frying one or more food products, it may, in some circumstances, be necessary to filter the shortening after only one cooking process.

U.S. Pat. No. 3,701,313-Boggs relates to a deep fat fryer unit utilizing a vacuum switch which closes when the filter is clogged. Closing of the vacuum switch automatically effects return of cooking oil from the cooking pot to the storage tank and is intended to preclude resumption of normal cooking operations until after the filter has been cleaned. However, as indicated in the Boggs patent, the operator can ignore the "change filter" warning and press an "operate" switch. This will pump oil from the storage tank which releases the vacuum so that oil will be circulated through the heater tank cooking pot and filter until a vacuum condition is again created, causing the "change filter" signal to be energized again. Thus, although normal operation cannot resume until the operator cleans the filter because the unit is disabled for normal cooking operations, the operator can repetitively ignore the "change filter" signal and cause an inefficient partial operation by pressing the "operate" switch prematurely.

U.S. Pat. Nos. 4,210,123-Moore et al and 4,324,173-Moore et al relate to a frying apparatus having a filter system using a control circuit for automatically turning off the frypot heaters when the cooking oil is drained during the filter cycle. The control circuit includes means for locking the frypot heating system in the off condition when the draining operation occurs. Reset is accomplished by first turning the fry pot off and then back on to insure that the operator exercises positive control before the heating system is energized.

For some types of products it is desirable or necessary to filter the cooking oil after only one cooking process or cycle in order to maintain product quality. Moreover, after a number of filterings it is desirable or necessary to change the cooking oil to maintain product quality.

Neither of the foregoing patents teaches apparatus which disables the cooking apparatus after only one or more cooking processes using the cooking oil or shortening and which maintains a cooking process lockout if the filtering has not been carried out, reenabling the cooking apparatus only after the filtering of the shortening.

It is an object of the present invention, therefore, to provide a new and improved cooking apparatus which avoids one or more of the disadvantages of prior such apparatus.

It is another object of the invention to provide a new and improved cooking apparatus including a digitally controlled microcomputer which disables the cooking apparatus after only one cooking process utilizing a cooking oil and maintains a cooking process lockout if filtering of the cooking oil has not been carried out.

It is another object of the invention to provide a new and improved cooking apparatus including a digitally controlled microcomputer for locking out the initiation of a cooking process until the cooking oil has been changed.

It is another object of the invention to provide a new and improved cooking apparatus in which a selected cooking process can be aborted only during a limited time period after the cooking process has commenced and a minor portion of the cooking process has been accomplished.

In accordance with the invention, cooking apparatus comprises means for selecting a program subroutine for programming a microcomputer to control a cooking process utilizing a cooking medium. The apparatus includes parameter-sensor means for sensing a parameter of a cooking medium and means responsive to the parameter-sensor means for determining whether the microcomputer should begin the subroutine. The apparatus also includes register means responsive to the program subroutine for storing timing information relating to the cooking process and means responsive to the determining means for decrementing the register means as the cooking process continues. The apparatus also includes means responsive to the register means for determining whether the cooking process is complete and means for filtering the cooking medium when one or more cooking processes is complete. The apparatus also includes means responsive to the parameter-sensor means for determining whether the cooking medium has been filtered after completion of the one or more cooking processes and means responsive to the filter-determining means upon completion of the one or more cooking processes for locking out the initiation of a cooking process for a period at least until the filter-determining means determines that the cooking medium has been filtered.

Referring now to the drawings

FIGS. 3A, 3B and 4 are a flow chart comprising a representation of a portion of a microcomputer which operates according to a computer program produced according to the flow chart.

Figure 2:
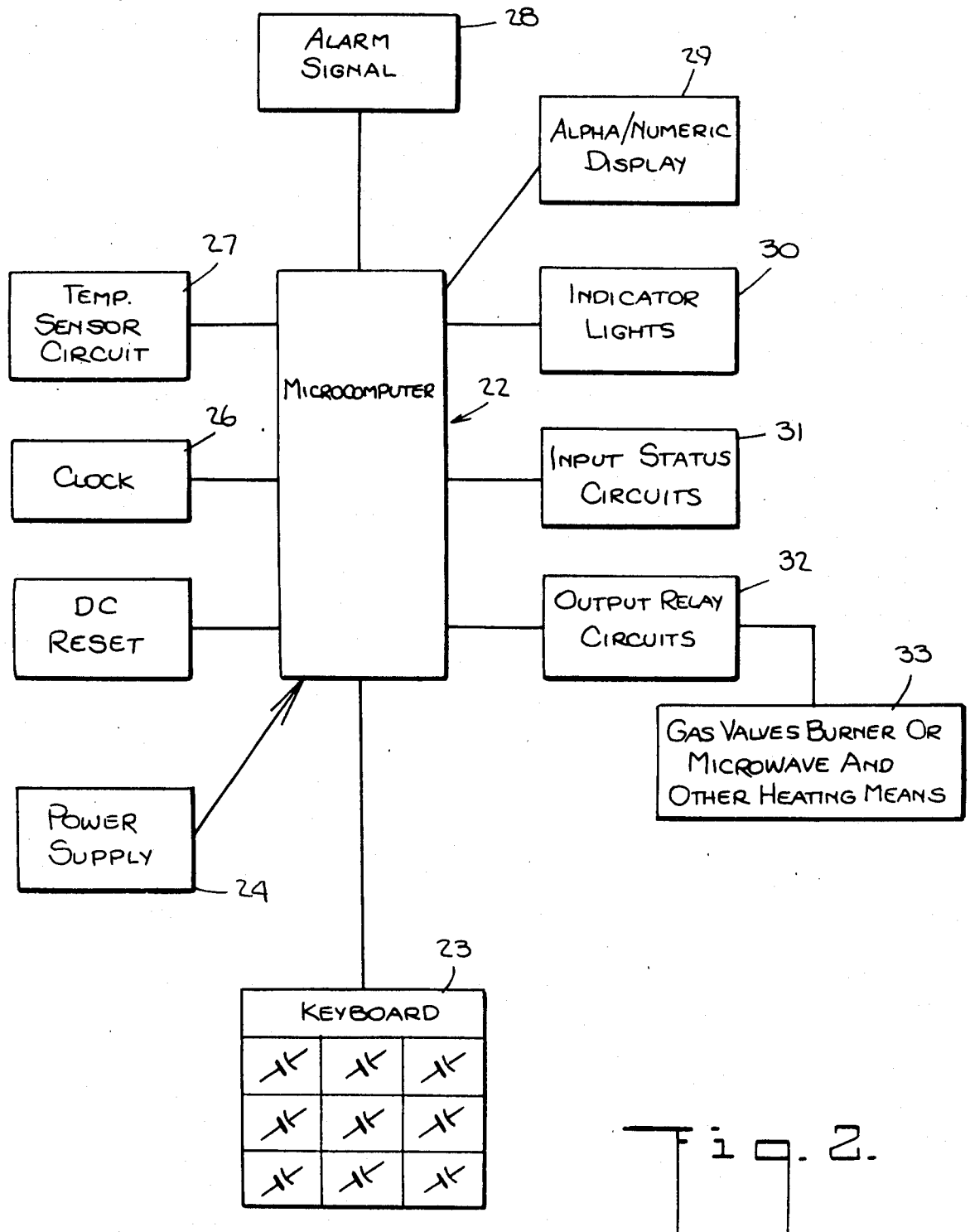
FIG. 2 represents cooking apparatus including a microcomputer and constructed in accordance with the invention.

Before referring to the drawings in detail, it will be understood that for purposes of clarity, the apparatus represented in block diagrams in FIGS. 2 and 3 utilizes, for example, an analog-to-digital converter and a microprocessor which includes such hardware as a central processing unit, program and random access memories, timing and control circuitry, input-output interface devices and other conventional digital subsystems necessary to the operation of the central processing unit as is well understood by those skilled in the art. The microprocessor operates according to the computer program produced according to the flow chart represented in the drawings.

Figure 1:
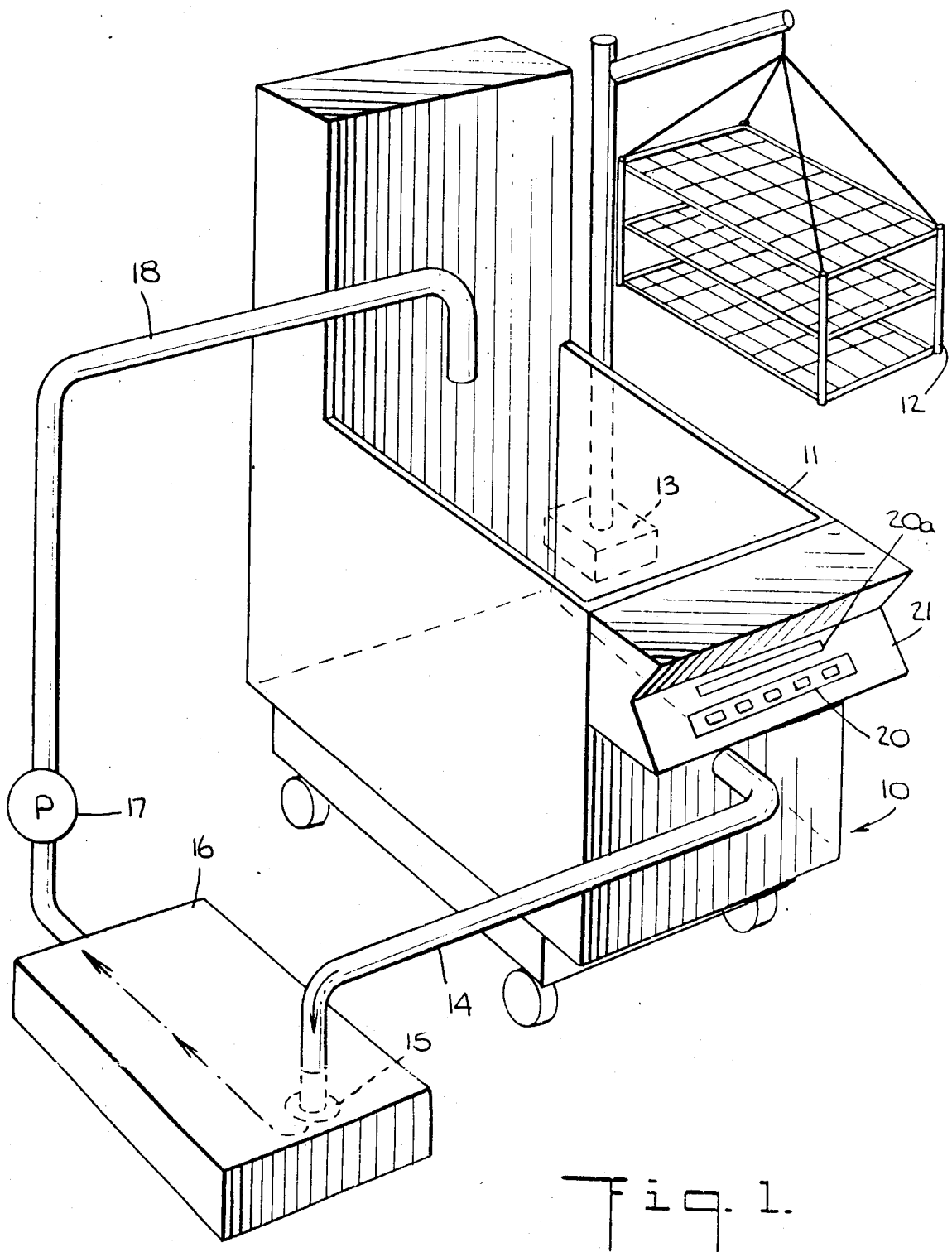
FIG. 1 is a perspective view of a fryer including cooking apparatus constructed in accordance with the invention.

Referring now more particularly to FIG. 1 of the drawings, there is represented cooking apparatus 10 comprising, for example, a fryer 11 having a movable product basket 12 operated by a gear and motor train 13 for movement into and out of a cooking medium such as shortening in the fryer 11.

The frying apparatus 11 has an oil drain pipe 14 connected to a drain valve 15 in a filter unit 16. The filter unit preferably comprises papers and chemicals for filtering the cooking oil. A pump 17 is provided for returning the oil to the cooking apparatus via a pipe 18. A control panel 20 having a display screen 20a in a header assembly 21 is connected to a control including a microcomputer in the header assembly for operating the same.

Referring now more particularly to FIG. 2 of the drawings, the microcomputer 22 includes a central processing unit which receives an input from the keyboard 23 which may, for example, comprise a capacitive keyboard.

The control includes a conventional power supply 24, a reset circuit 25 for resetting the microcomputer when renewing power in the power supply, a clock oscillator circuit 26 for providing clock pulses to the microcomputer 22, a temperature sensor circuit 27 for sensing the temperature within the cooking apparatus, an audible alarm 28, an alpha/numeric display 29 and indicator lights 30. The apparatus also includes an input status circuit 31 which may, for example, be responsive to a door switch and to the open/close condition of the drain valve. The microcomputer controls an output relay circuit 32 which may, for example, control the gas valves of a burner or a heating element or microwave or other heating means forming a temperature-controlled heat source 33.

Figure 3A:
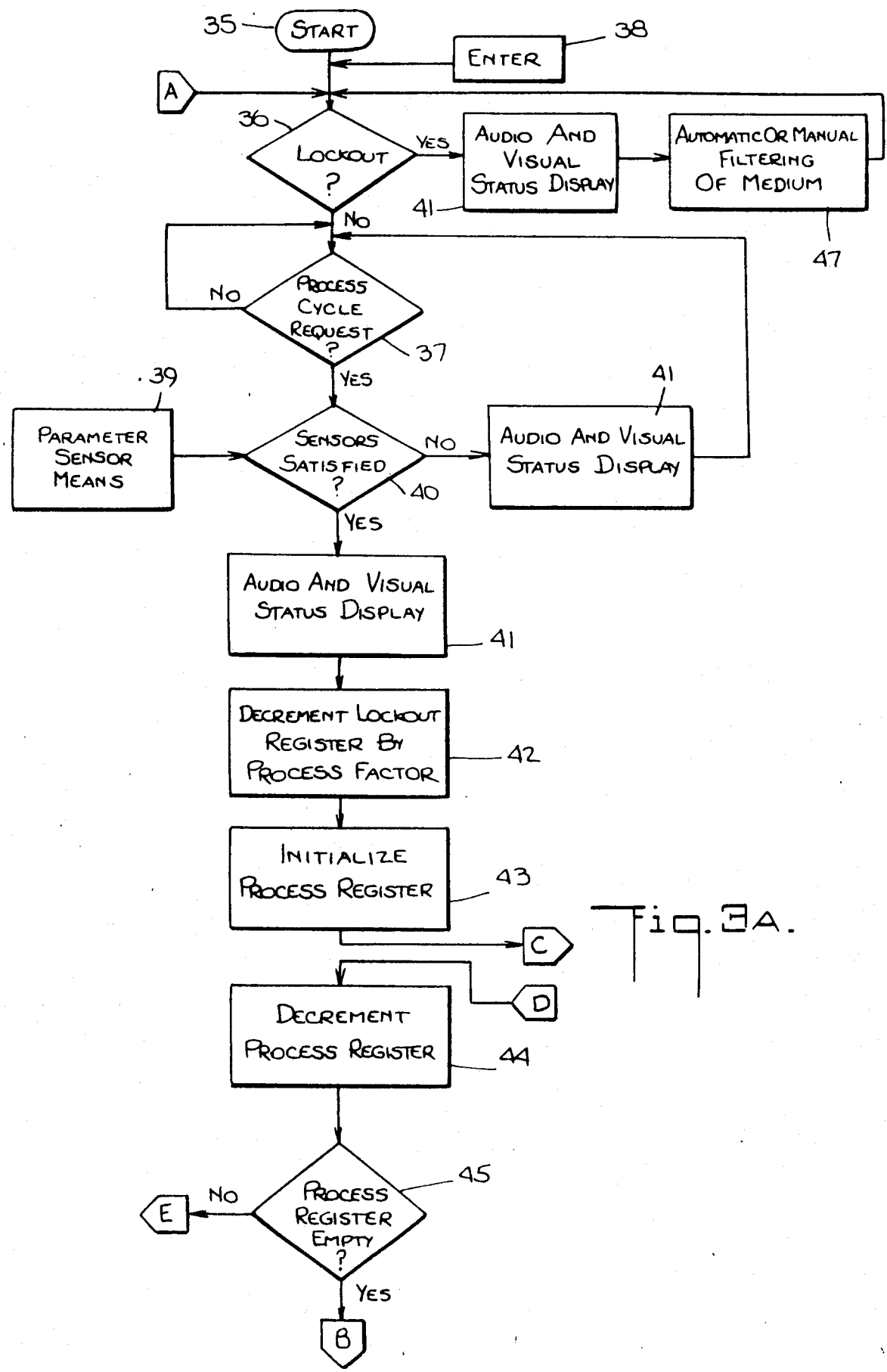
Figure 3B:
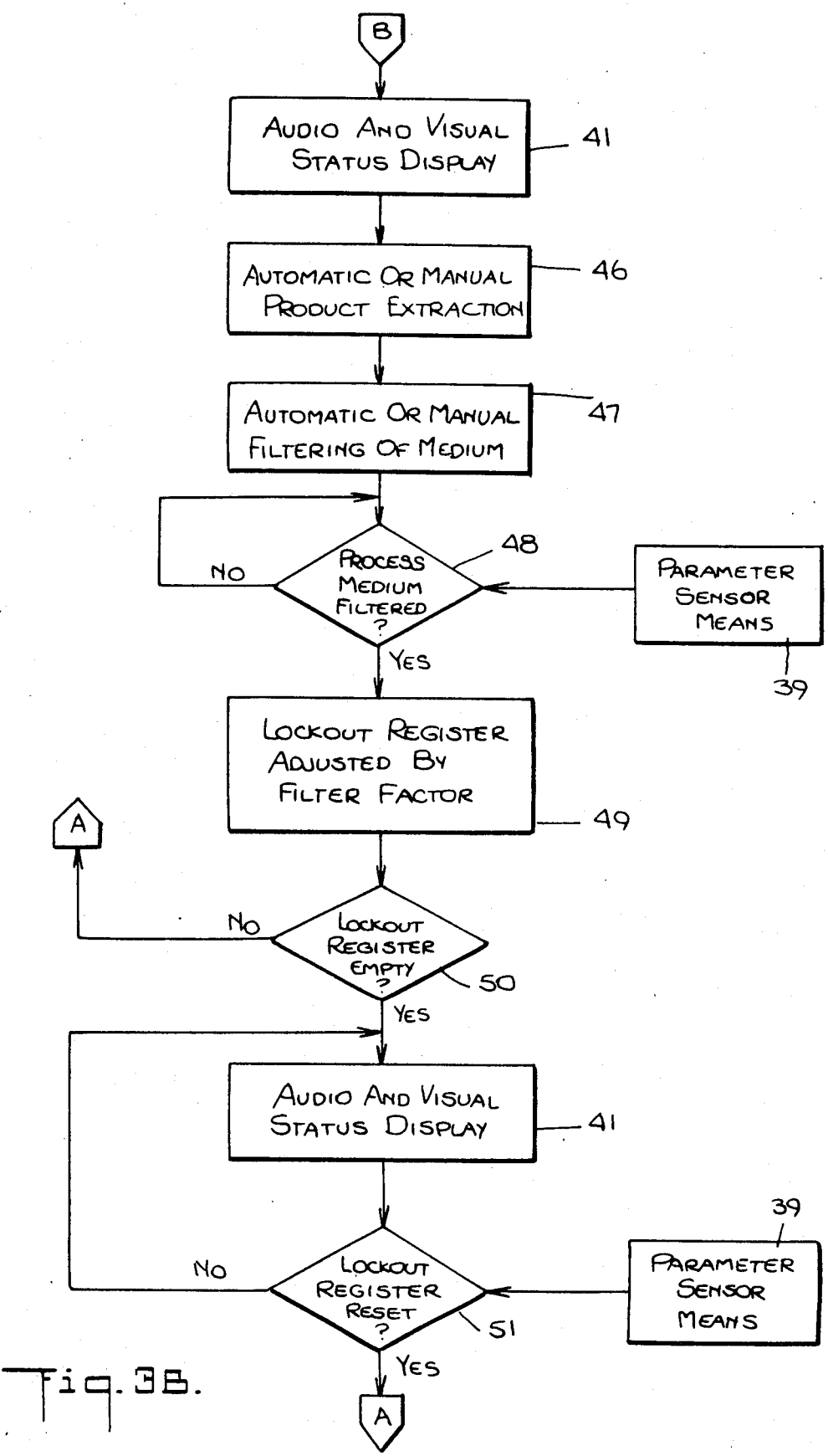

Considering now the programmed microcomputer with reference to the flow chart of FIGS. 3A, 3B and 4, the symbols A, B, C, D and E represent interconnected points of the drawings. The cooking apparatus includes a start key 35 coupled to a "lockout?" microprocessor portion 36 for determining whether the cooking apparatus is in a lockout mode which locks out the initiation of a cooking process until automatic or manual filtering of the cooking medium has been accomplished, as will be more fully explained subsequently.

If the cooking apparatus is not in a lockout mode the "lockout?" microprocessor portion 36 provides a "no" output to a "process cycle request?" microprocessor portion 37 which determines whether a cooking cycle has been requested. The cooking cycle may be requested by means 38 for selecting a program subroutine for programming a microcomputer to control a cooking process utilizing a cooking medium. The selecting means 38 preferably comprises an "enter" portion 38 which may, for example, be a product cycle key, such as, a chicken cycle key.

The cooking apparatus also includes parameter-sensor means 39, for example, a temperature sensing probe, for sensing one or more parameters of the cooking medium. The "process cycle request?" microprocessor portion 37 is responsive to the parameter-sensor means 39 for determining whether the microcomputer should begin the subroutine.

The "process cycle request?" microprocessor portion 37 applies a "yes" output to a "sensor satisfied?" microprocessor portion 40. When the product cycle key 38 has been pressed, the microprocessor portion 37 may make a "no" determination because the "sensors satisfied?" microprocessor portion 40 determines that one or more sensors such as, for example, cooking medium level, temperature, pressure or humidity sensors, indicate that, for example, the temperature controlled cooking medium is not at the proper operating temperature. The "sensors satisfied?" microprocessor portion 40 then applies a "no" output to an audio and visual status display 41 which applies the "no" output to the input of the "process cycle request?" microprocessor portion 37. At this time, for example, the cooking medium may not be in the cooking apparatus and the "audio and visual status display" 41 may display the signal "fill".

When the sensors 39 are satisfied, the "no" output of the microprocessor portion 40 is terminated. The "sensors satisfied?" microprocessor portion 40 then applies a "yes" output to the audio and visual status display 41 which may, for example, indicate the visual display "drop".

The microprocessor preferably also includes means responsive to the selected cooking process and the filtering of the cooking medium for determining when the cooking medium requires changing after completion of the selected cooking process and for locking out the initiation of a cooking process upon completion of one or more cooking processes for a period at least until the cooking medium has been changed. In this connection the microcomputer includes a "decrement lockout register by process factor" microprocessor portion 42 which decrements a lockout register in accordance with a function of the idling temperature and the idling time and an idling constant plus a function of the cooking process temperature and the cooking process time and a cooking process constant. The "decrement lockout register by process factor" microprocessor portion 42 applies the "yes" output to an "initialize process register" microprocessor portion 43. The "initialize process register" microprocessor portion 43 then loads a process register according to the cooking process so that the process register is responsive to the program subroutine for storing timing information relating to the cooking process.

A cooking process (product cook cycle) can be canceled by a process abort. A typical process abort can be accomplished by pressing the product key on the computer keyboard 23 a second time after having initiated a product cook cycle by a key depression. In order to prevent operators from waiting until several seconds before the end of a product cook cycle to cause a process abort and return the operation of the apparatus to the "lockout?" portion 36 as if the product cook cycle were completed and then actuated by the "enter" portion 38 and thereby bypass the filter lockout for that cooking cycle, the apparatus provides a filter lockout while still enabling a process abort for some relatively short or minor period of time (e.g. 30 seconds) after a process has started. A process abort is a desirable feature in itself because an operator may press a wrong key by mistake and wish to correct his mistake without allowing the apparatus to perform an entire cooking process. However, the operator is prevented from increasing his productivity and sacrificing quality by bypassing filter lockout when a cooking process has been nearly completed. This assures that the shortening is cleansed regularly and enables the cooked product to maintain a consistently high product quality.

The "intialize process register" microprocessor portion 43 applies a signal indicating that the process register has been loaded to an "initialize abort enable timer" microprocessor portion 52 (FIG. 4). The "initialize abort enable timer" 52 actuates a "set abort enable" microprocessor portion 53 which actuates a "decrement abort enable timer" microprocessor portion 54. A "does abort enable timer equal 0?" microprocessor portion 55 is responsive to the microprocessor portion 54. If the abort enable timer does not equal 0, a "no" output is applied to the "decrement abort enable timer" 54 to continue the decrementing of the abort enable timer.

The apparatus also includes means 44 responsive to the "process cycle request?" determining means 37 for decrementing a process register means as the cooking process continues. If the "does abort enable timer equal 0?" microprocessor portion 55 provides a "yes" output indicating that a time period, which preferably is relatively short, during which abort can be enabled by a second key depression, has expired, the "yes" output of the microprocessor portion 55 is applied to a "cancel abort enable" microprocessor portion 56 which provides an output representative of "yes" output of the "process cycle request?" determining means 37 (FIG. 3A) for decrementing a process register means as the cooking process continues.

If an operator causes an abort by a second product key depression while the abort timer has not reached zero, the "has process been aborted and abort enable set?" microprocessor portion 57 (FIG. 4) provides a "yes" output to the "lockout?" microprocessor portion 36, thereby aborting the previous cooking process. If a second product key depression has not been made during this period while the abort timer has not reached zero, the "has process been aborted and abort enable set?" microprocessor portion 57 provides a "no" output to the "decrement process register" microprocessor portion 44, causing the process register to be decremented step-by-step.

If an abort is initiated after the "does abort timer equal 0?" microprocessor portion 55 has reached zero, the process will not abort but will apply "no" output to the "decrement process register" 44, causing the process register to be decremented step-by-step.

The means 44 comprises a "decrement process register" microprocessor portion 44 responsive to the "process cycle request?" determining 37 for decrementing a process register means as the cooking process continues. The microprocessor also includes means 45 responsive to the process register means for determining whether the cooking process is complete. The means 45 comprises a "process register empty?" microprocessor portion 45. Upon actuation by the microprocessor portion 44 while the cooking processs is not complete, the means 45 applies a "no" output to the "has process been aborted and abort enable set?" microprocessor portion 57 so that the microprocessor portion 57 is capable of providing a "yes" or "no" output while the "process register empty?" microprocessor portion 45 indicates that the process register is not empty and thus that the cooking process is not complete. A "no" output continues the decrementing of the process register by the "decrement process register" 44. A "yes" output is provided to the "lockout?" microprocessor portion 36, thereby aborting the previous cooking process as described previously.

In response to a "no" output of the microprocessor portion 57, the "decrement process register" 44 continues the decrementing of the register until the cooking process is complete. The microprocessor portion 45 then provides a "yes" output to the status display 41 which may, for example, display the word "filter" indicating that a filter operation is necessary, for example, after only one cooking process or cycle. The "initialize process register" microprocessor portion 43 and the "decrement process register" 44 may be programmed so that the "process register empty?" microprocessor portion 45 does not provide a "yes" output until after a selected plurality of cooking processes or cooking cycles, if desired. The audio display 41 may also, for example, give an audio warning.

The decrementing of the process register by the "decrement process register" microprocessor portion 44 may be done by, for example, a timer or a complex computer program function.

FIG. 3B indicates by the schematic representation 46 "automatic or manual product extraction" that the product is removed from the cooking medium by the basket 12 of FIG. 1 being displaced out of the cooking medium through control of a motor and gear train, in response to the "yes" output of the "process register empty?" microprocessor portion 45. The apparatus also includes means for filtering the cooking medium when one or more cooking processes is complete as indicated by the schematic representation "automatic or manual filtering of medium" 47. The filtering of the medium occurs by the opening of the drain valve 15 (FIG. 1), which preferably is done automatically in response to the "yes" output from the "process register empty?" microprocessor portion 45.

The apparatus comprises means 48 responsive to the parameter-sensor means 39 for determining whether the cooking medium has been filtered. Sensor 39 for the cooking medium, which may, for example, be a temperature, level, pressure or humidity sensor, alone or in combination, applies its output to "process medium filtered?" microprocessor portion 48.

If the cooking medium has not been filtered the "process medium filtered?" microprocessor portion 48 provides a "no" output and the apparatus is then in lockout mode. During lockout mode, the "enter" key 38 is ineffective to initiate a process cycle. Also, referring to FIG. 2, during lockout mode, the microcomputer 22 causes the output relay circuit 32 to disable the temperature-controlled heat source 33.

If the cooking medium has been filtered and has been pumped back into the apparatus after filtering, the temperature of the cooking medium will have dropped substantially to the temperature of the filtered medium and a "yes" output is applied to a "lockout register adjusted by filter factor" microprocessor portion 49. The "lockout register adjusted by filter factor" microprocessor portion 49 increments the lockout register to take into account that the cooking medium has been filtered. The filter factor is a factor representing the additional cooking process time that the cooking medium can be used as a result of the filtering, without requiring the medium to be changed.

A "lockout register empty?" microprocessor portion 50 is responsive to the microprocessor portion 49 and provides a "no" output to the "lockout?" microprocessor portion 36 when the lockout register is not empty so that the microprocessor portion 36 can supply a "no" output to the "process cycle request" microprocessor portion 37 to indicate that the apparatus is not in lockout mode. The "enter" portion 38 may then be utilized to select any new or the same product key to select a subroutine to control a subsequent cooking process.

If the "lockout register empty?" microprocessor portion 50 determines that the lockout register is empty, the microprocessor portion 50 provides a "yes" output to the audio and visual status display 41 which may, for example, display "change", indicating a change of the cooking medium is necessary.

The microprocessor preferably includes means responsive to the selected cooking process and the filtering of the cooking medium for determining when the cooking medium requires changing and for locking out the initiation of a cooking process until the cooking medium has been changed. This means preferably comprises the "lockout register empty?" microprocessor portion 50. The "lockout register empty?" microprocessor portion 50 provides a "yes" output to the audio and visual display 41 and the "lockout register reset?" microprocessor portion 51 provides a "no" output thereto for locking out the initiation of a cooking process until the cooking medium has been changed. A "yes" output is not provided by the "lockout register reset?" microprocessor portion 51 until the "lockout register reset?" microprocessor portion 51, in response to parameter sensor means 3, determines that the lockout register has been manually or automatically reset after the cooking medium has been changed so that the pressing of a product key will not initiate a cooking process until the cooking medium has been changed.

When the cooking medium has not been changed, for example, the sensor 39 remains at a high cooking temperature and signals the "lockout register reset?" microprocessor portion 51 when the cooking medium has been changed by falling to the low temperature of the new cooking medium. When the cooking medium has been changed and the lockout register has been reset, the "lockout register reset?" microprocessor portion 51 provides a "yes" output from microprocessor portion 51 to the "lockout? " microprocessor portion 36 so that pressing a product key will initiate a cooking process.

While the apparatus is in lockout mode, the "lockout?" microprocessor portion 36 provides a "yes" output to the audio and visual status display 41 which may, for example, then indicate "filter." The "yes" output of the "lockout?" microprocessor portion 36 can initiate automatic or manual filtering of the cooking medium as indicated by "automatic or manual filtering of medium" schematic representation 47. A signal from parameter sensor 39 to "process medium filtered?" microprocessor portion 48 then causes a "yes" output to "lockout register adjusted by filter factor" microprocessor portion 49. The "lockout register empty?" microprocessor portion 50 is responsive to microprocessor portion 49 and provides a "no" to the "lockout?" microprocessor portion 36 when the lockout register is not empty so that the microprocessor portion 36 can supply a "no" output to the "process cycle request" microprocessor portion 37 to indicate that the medium has been filtered and that the apparatus is not in a lockout mode.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Cooking apparatus comprising:
    means for selecting a program subroutine for programming a microcomputer to control a cooking process utilizing a cooking medium;
    parameter-sensor means for sensing a parameter of the cooking medium;
    means responsive to said parameter-sensor means for determining whether the microcomputer should begin the subroutine;
    register means responsive to said program subroutine for storing timing information relating to the cooking process;
    means responsive to said determining means for decrementing said register means as the cooking process continues;
    means responsive to said register means for determining whether the cooking process is complete;
    means for filtering the cooking medium when one or more cooking processes is complete;
    means responsive to said parameter-sensor means for determining whether the cooking medium has been filtered after completion of the one or more cooking processes; and
    means responsive to said filter-determining means upon completion of the one or more cooking processes for locking-out the initiation of a cooking process for a period at least until said filter-determining means determines that the cooking medium has been filtered.

2. Apparatus in accordance with claim 1, which includes means for removing the product from the cooking medium when the cooking process is complete.

3. Apparatus in accordance with claim 1, in which said cooking-process program-subroutine-selecting means is effective to program said microcomputer to control the cooking process after said filter-determining means determines that the cooking medium has been filtered.

4. Apparatus in accordance with claim 1, which comprises means for displaying the temperature of the cooking medium.

5. Apparatus in accordance with claim 1, which comprises means for displaying the status of the cooking medium requiring filtering when the cooking process is complete.

6. Apparatus in accordance with claim 1, which includes means responsive to the selected cooking process and the filtering of the cooking medium for determining when the cooking medium requires changing and for locking-out the initiation of a cooking process until the cooking medium has been changed.

7. Apparatus in accordance with claim 1, which includes a temperature-controlled heat source and which includes means for disabling the heat source during the lock-out period.

8. Apparatus in accordance with claim 1, which includes means for aborting the cooking process only after the expiration of a predetermined period during which the process can not be aborted.

* * * * *